(12) United States Patent
Ng et al.

(10) Patent No.: US 12,019,499 B2
(45) Date of Patent: Jun. 25, 2024

(54) SYSTEM AND METHOD TO REDUCE POWER DOWN ENTRY AND EXIT LATENCY

(71) Applicant: Advanced Micro Devices, Inc., Santa Clara, CA (US)

(72) Inventors: Mom-Eng Ng, Austin, TX (US); Dilip Kumar Jha, Hyderabad (IN)

(73) Assignee: Advanced Micro Devices, Inc., Santa Clara, CA (US)

(*) Notice: Subject to any disclaimer, the term of this patent is extended or adjusted under 35 U.S.C. 154(b) by 105 days.

(21) Appl. No.: 17/553,657

(22) Filed: Dec. 16, 2021

(65) Prior Publication Data
US 2023/0195204 A1 Jun. 22, 2023

(51) Int. Cl.
G06F 1/3296 (2019.01)
G06F 1/324 (2019.01)
G06F 1/3246 (2019.01)
G06F 9/4401 (2018.01)

(52) U.S. Cl.
CPC ............ G06F 1/3296 (2013.01); G06F 1/324 (2013.01); G06F 1/3246 (2013.01); G06F 9/4418 (2013.01)

(58) Field of Classification Search
CPC ...... G06F 1/3296; G06F 1/324; G06F 1/3246; G06F 9/4418
See application file for complete search history.

(56) References Cited

U.S. PATENT DOCUMENTS

| 10,303,200 B2 | 5/2019 | John et al. |
| 2010/0237924 A1 | 9/2010 | Reeves et al. |
| 2013/0295843 A1* | 11/2013 | Tian .................. H04B 1/40 |
| | | 455/41.1 |
| 2018/0091125 A1 | 3/2018 | Carlson et al. |
| 2020/0310527 A1* | 10/2020 | Gendler .............. G06F 1/3287 |
| 2021/0056063 A1 | 2/2021 | Seger, Jr. et al. |

FOREIGN PATENT DOCUMENTS

| KR | 20120128482 A | 11/2012 |
| KR | 20190113809 A | 10/2019 |

* cited by examiner

*Primary Examiner* — Kim Huynh
*Assistant Examiner* — Cory A. Latham
(74) *Attorney, Agent, or Firm* — VOLPE KOENIG

(57) ABSTRACT

A system and method for fast save/restore is disclosed. The system and method include one or more logical units (LUs) residing in independent power domains, one or more digital frequency synthesizers (DFS), each of the one or more DFS associated with one of the one or more LUs, the one or more DFSs configured to lock a system complex frequency and ramp the one or more LUs to system complex frequency, and one or more slave fast save/restore control (FSRC) units, each slave FSRC unit associated with one of the one or more LUs, the one or more slave FSRC units configured to save/restore the FSRC states of the one or more LUs.

20 Claims, 6 Drawing Sheets

SYSTEM AND METHOD TO REDUCE POWER DOWN ENTRY AND EXIT LATENCY

BACKGROUND

A system complex consists of one or more logical units (LU). The time required for a system complex to enter and exit a powered down state influences the residency of that state. Shorter entry and exit latencies increase both the residency in the state as well as the likelihood of entering the state resulting in an overall power reduction.

BRIEF DESCRIPTION OF THE DRAWINGS

A more detailed understanding can be had from the following description, given by way of example in conjunction with the accompanying drawings wherein.

DETAILED DESCRIPTION

Figure 1:
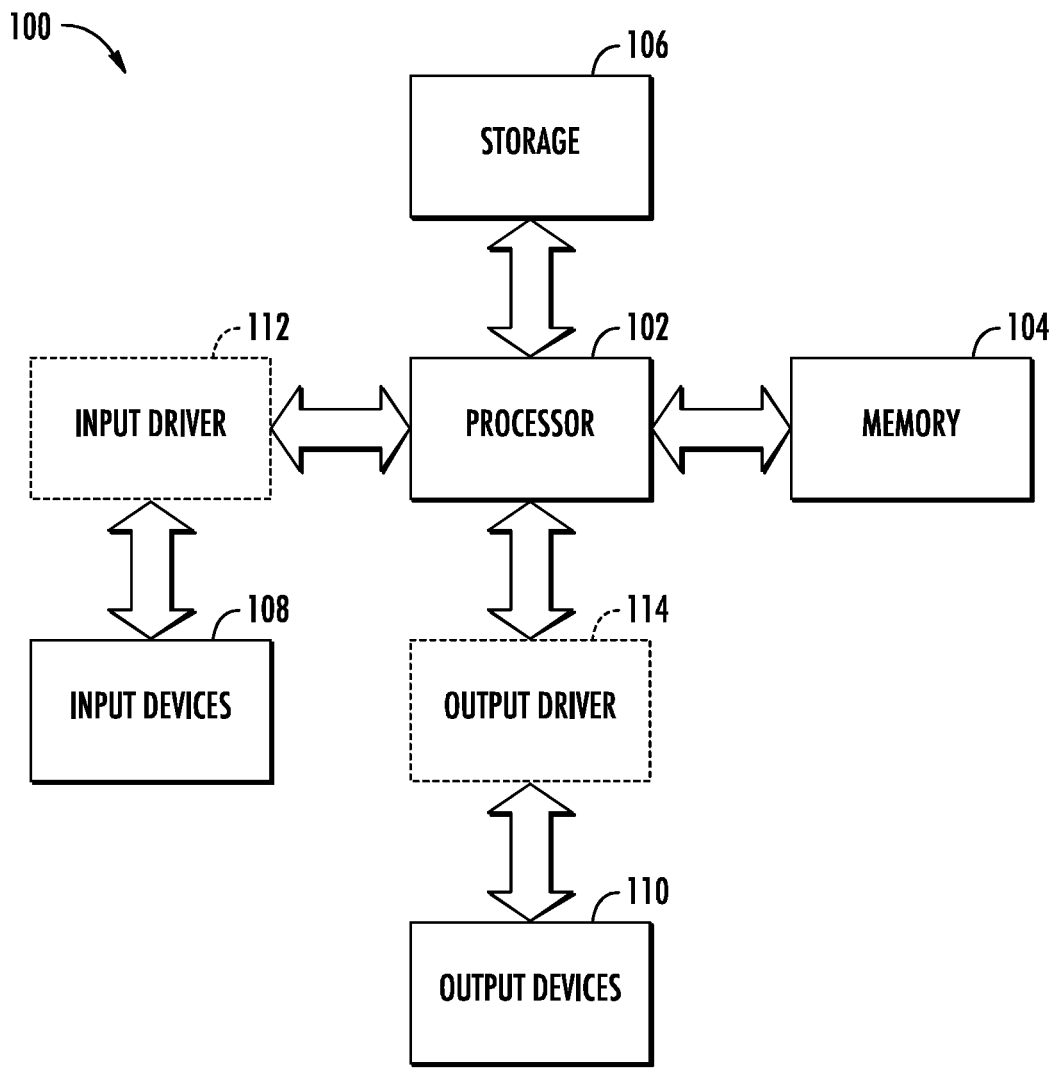
FIG. 1 is a block diagram of an example device in which one or more features of the disclosure can be implemented.

A system and method for reducing power down entry and exit latency are described. The system includes of one or more logical units with independent power domains and digital frequency synthesizers (DFS). A controller in the system manages the logical unit power states and supports a system power down state. The system power down state requires the controller state to be saved and restored on power down entry and exit. A method to maximize the entry and exit frequency while supporting a non-active lower frequency is described. The higher frequency during state save and restore significantly reduces power down entry and exit latency without compromising overall power efficiency.

The entry to SOC low power states are qualified by the total transition latency of the state. The total transition latency of the state includes both an entry latency and exit latency. By reducing total latency additional SOC low power state entries are available, longer SOC low power state residencies per entry, and lower overall SOC power consumption and longer battery life. Previous solutions often included high exit latencies. For example, low power entry/exit sequence in some solutions occurs at 1.4 Ghz with a 300 us restore latency.

The described system and method improve the total transition latency of the state and can be adopted in next generation SOCs benefiting logical units (LUs) like CPU Core, Graphics core, and the like. A system and method for fast save/restore is disclosed. The system and method include one or more LUs residing in independent power domains, one or more DFS, each of the one or more DFS associated with one of the one or more LUs, the one or more DFSs configured to lock a system complex frequency and ramp the one or more LUs to system complex frequency, and one or more slave fast save/restore control (FSRC) units, each slave FSRC associated with one of the one or more LUs, the one or more slave FSRCs configured to restore the FSRC states of the one or more LUs.

In a low power exit, the system and method include locking to a system complex frequency utilizing a system DFS, ramping a plurality of LUs to the system complex frequency by utilizing the system DFS in communication with at least one DFS associated with ones of the plurality of LUs, restoring LU FSRC states utilizing a slave FSRC unit associated with ones of the plurality of LUs, for an LU of the plurality of LUs that is waking up, exiting low power state at the restored frequency and for an LU of the plurality of LUs that is not waking up, ramping down to a minimum low frequency state, and restarting a reset sequence for the LU of the plurality of LUs. The low power exit can include a producer outputting data packets to the LUs that is misaligned in bandwidth with the consumer receiving the data packets. The low power exit can include a producer outputting data packets to the LUs that is misaligned in throughput with the consumer receiving the data packets.

In a low power entry, the system and method include ramping a plurality of LUs to a system frequency utilizing a system DFS, saving a FSRC state utilizing a slave FSRC unit associated with ones of the plurality of LUs, for an LU of the plurality of LUs that is waking up, exiting the low power state at an operational frequency and for an LU of the plurality of LUs that is not waking up, ramping down to a minimum low frequency state, and restarting reset sequence for the LU of the plurality of LUs. The low power entry can include a producer outputting data packets to the LUs that is misaligned in bandwidth with the consumer receiving the data packets. The low power entry can include a producer outputting data packets to the LUs that is misaligned in throughput with the consumer receiving the data packets.

The system and method can include one or more LUs comprising CPU cores, graphics cores, or other processors. Each DFS of one or more DFS can be uniquely matched with one of the one or more LUs. Each slave FSRC unit of one or more slave FSRC unit can be uniquely matched with one of the one or more LUs. Each slave FSRC unit of one or more slave FSRC unit can be uniquely matched with one of the one or more DFS. The system and method includes a master fast save restore control (FRSC) unit configured to interface with the one or more slave FSRC units inside each LU via the DFS. The master/slave FSRC units can control the system and slave FSRC unit clocks during low power entry/exit sequences. The master FSRC unit can operate with each slave FSRC unit to control the LU frequency. The master FSRC unit can enable a maximum frequency in the LU DFS at the start of a power sequence. The power sequence is one of a power down entry and a power down exit. Each slave FSRC unit tracks the LU context save or restore, can enter a low frequency state after save or restore completion for non-active LUs and enters an operational frequency state after save or restore completion for active LUs. The power down entry and exit latency is reduced by operating the LUs and the system at a maximum frequency during state save and restore.

FIG. 1 is a block diagram of an example device 100 in which one or more features of the disclosure can be implemented. The device 100 can include, for example, a computer, a gaming device, a handheld device, a set-top box, a television, a mobile phone, server, a tablet computer or other types of computing devices. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid-state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm can perform the functionality described herein. Alternatively, it is contemplated that computing systems that do not perform processing tasks in accordance with a SIMD paradigm can also perform the functionality described herein.

Figure 2:
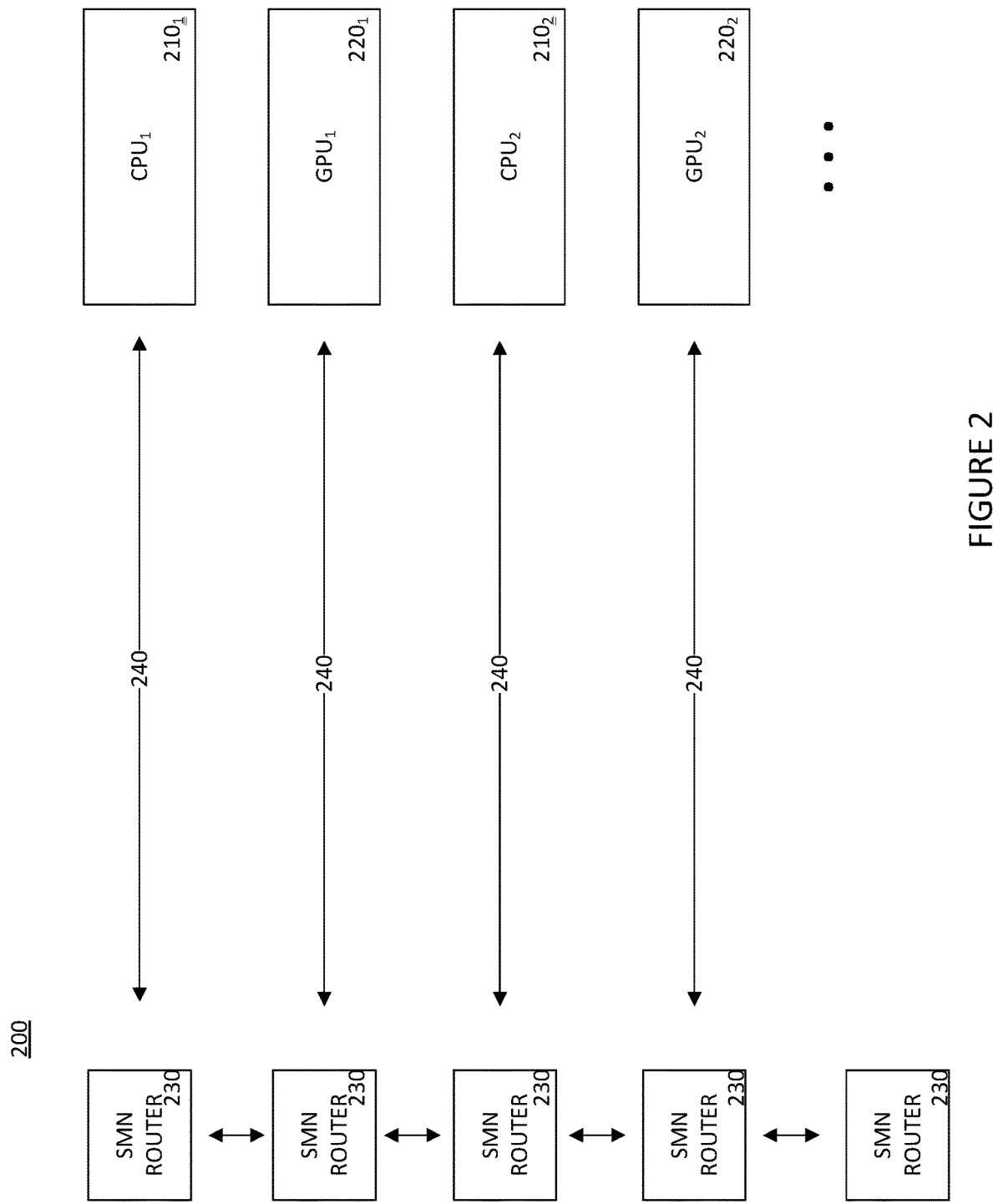
FIG. 2 is a block diagram of elements of the device, illustrating additional details related to features of the disclosure.

FIG. 2 is a block diagram 200 of elements of the device 100, illustrating additional details related to features of the disclosure. Diagram 200 includes a depiction of a plurality of CPUs 210 (individually represented by CPU 210$_1$ and CPU 210$_2$) and a plurality of GPUs 220 (individually represented by GPU 220$_1$ and GPU 220$_2$). Additionally, or alternatively, while CPUs and GPUs are depicted, one of ordinary skill in the art will appreciate that other IPs can be utilized in conjunction with, or in lieu of, one or both of (a) CPUs and (a) GPUs. Each of the plurality of CPUS 210 and the plurality of GPUs 220 are connected to a system management network (SMN) router 230 via one or more network buses 240. SMN router 230 can be interconnected by another series of buses. Ones of more of the depicted network buses 240 can have different widths and operate using different clock frequencies. SMN routers 230 can be a single device. That is the series of SMN routers 230 may be a single SMN router 230 even though they are illustrated using several distinct boxes in FIG. 2. Alternatively, SMN routers 230 may be a series of interconnected routers that are communicatively coupled.

The system includes of one or more LUs with independent power domains and DFSs. A controller in the system manages the logical unit power states and supports a system power down state. The system power down state requires the controller state to be saved and restored on power down entry and exit. A method to maximize the entry and exit frequency while supporting a non-active lower frequency is described. The higher frequency during state save and restore significantly reduces power down entry and exit latency without compromising overall power efficiency. The system and method can benefit the LU (processors) described above with respect to FIGS. 1 and 2 by maximizing the entry and exit frequency to enable the LUs to reduce power down entry and exit latency without compromising the overall power efficiency of the LUs.

The low power entry/exit latency issue can arise as a result of a misaligned network throughput and/or misaligned network bandwidth. The misaligned network throughput can occur when one side has a lower throughput than the other. The misaligned network bandwidth can occur when one side has a lower bandwidth than the other. Additionally, or alternatively, bandwidth and throughput can be identical but frequencies can be misaligned during lower power entry and exit transitions.

Figure 3:
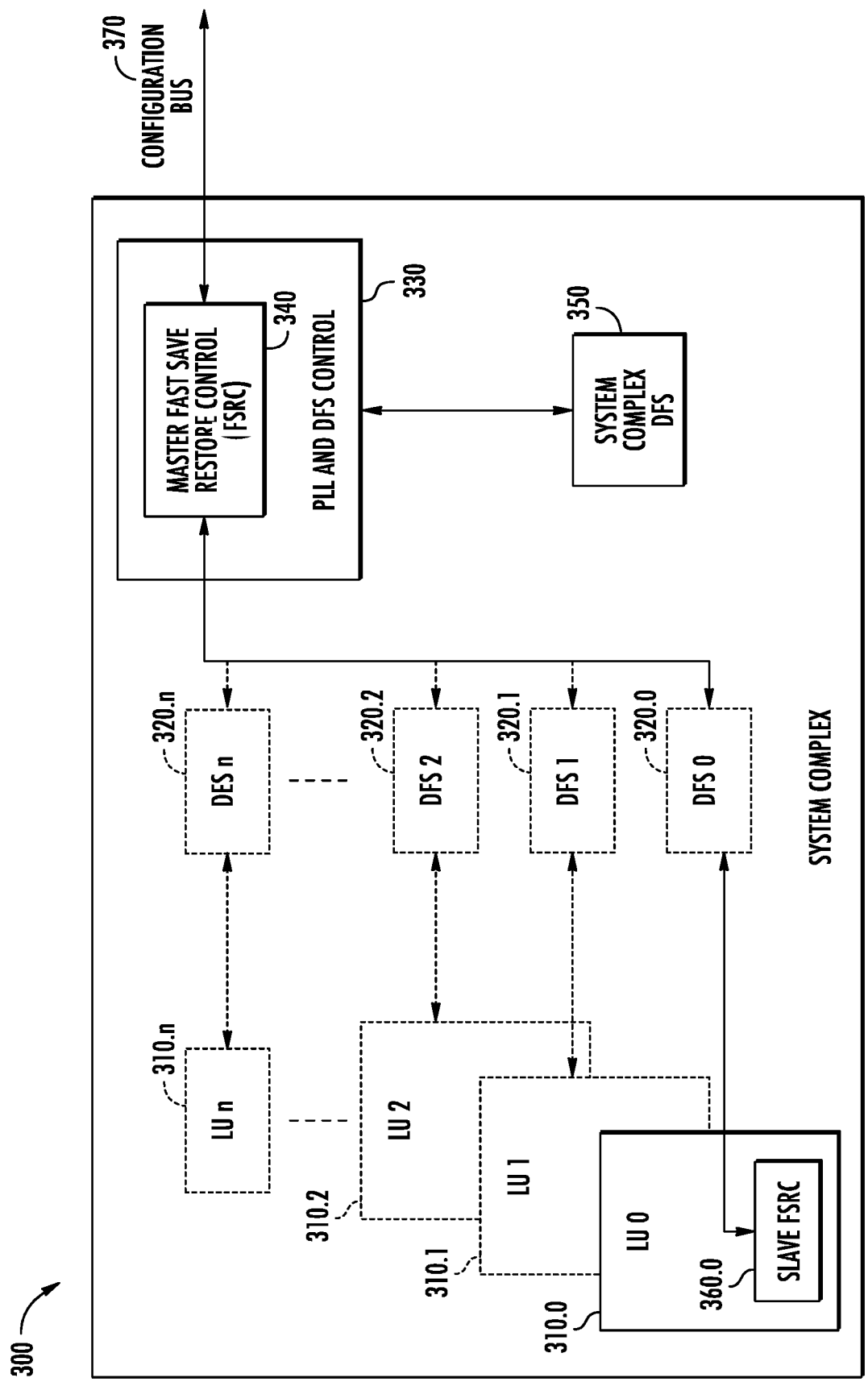
FIG. 3 illustrates a high-level system for fast save/restore.

By way of example, a system includes one or more LUs, each of which is connected using a network with identical bandwidth capabilities. Each LU requires multiple cycles to process a save/restore burst sequence since register accesses are serialized. As a result, the system throughput is higher than that of individual LUs. This imbalance is exacerbated when the LU frequency is slower than the system frequency. As is illustrated in FIG. 3, in order to overcome this network throughput imbalance, the FSRC unit increases the throughput on demand, with no impact to nominal operational power and minimal hardware support. More specifically, the master FSRC unit 340 detects the beginning of low power entry/exit sequence. For an exit sequence, the master FSRC unit 340 waits until the PLL locks (the PLL lock is not required for an entry sequence). For both exit/entry, the master FSRC unit 340 ramps both master DFS 350 and the slave DFS 320 to same frequency. The restore/save sequence begins with the LUs 310 locked to higher frequency than low power state. Once restore/save finishes, the slave FSRC unit 360 detects the end of restore/save sequence and requests the master FSRC unit 340 to restore the low power frequency since the LUs are still in low power state during the sequence. Since the LUs 310 and the system 300 are in same power domain for increasing frequency an increased voltage is not required. Since the frequency is increased only during save/restore period, an increase in the save/restore throughput is enabled which reduces the latency, and therefore there is no impact to nominal operational power.

Similarly, a system network data rate is 16—bits. The SOC network data rate is 32-bits. As will described, in order to overcome this network bandwidth mismatch, the system internal clock can be increased to 2× of SOC network clock. Specifically, the maximum frequency uplift is designated by the bus width mismatch. For example, given a producer bus width of N-bits and a consumer bus width of M-bits, the maximum frequency uplift multiplication factor is M/N. Specifically, for example, for a 32-bit producer and a 64-bit consumer, the maximum frequency uplift multiplication factor is 2. The maximum allowed frequency uplift is implementation specific as implementation has to meet timing for maximum frequency case. If implementation supports a maximum frequency uplift M/N, then system FRSC can increase the frequency divisor nearest to the M/N factor of the consumer or the producer frequency based on which is implemented at a lower bus width before the beginning of a save/restore sequence and the scale back to the prior divisor as the post sequence ends.

FIG. 3 illustrates a high-level system 300 for fast save/restore. System 300 includes one or more LUs 310 that can reside in independent power domains. As illustrated in FIG. 3, logical units include LU 0 310.0, LU 1 310.1, LU 2 310.2 through LU n 310.n (and are collectively referred to as LUs 310). It is to be understood that the LUs 310 can be a CPU core, graphics core, or other processor, for example. LUs 310 can interact with shared units, such as L2 or L3 caches (not shown), chip pervasive logic (CPL) including a PLL, clock or reset logic that sequences the system units, for example.

Associated with each of the LUs 310 are DFS 320. As illustrated in FIG. 3, digital frequency synthesizers include DFS 0 320.0, DFS 1 320.1, DFS 2 320.2 through DFS n 320.n (and are collectively referred to as DFSs 320). As illustrated, DFS 320 is uniquely matched with LU 310, although other configurations of DFSs matched to LUs can be envisioned and are understood to be included herein.

Associated with each of the LUs 310/DFSs 320 are slave fast save restore control (FSRCs) units 360. As illustrated (and understood) in FIG. 3, slave fast save restore control includes slave FSRC unit 0 360.0, slave FSRC unit 1 360.1 (understood but not specifically shown), slave FSRC unit 2 (understood but not specifically shown) through slave FSRC unit n (understood but not specifically shown) (and collectively referred to as slave FSRC units 360). As illustrated, slave FSRC unit 360 is uniquely matched with LU 310 and DFS 320, although other configurations of FSRC unit matched to LU/DFS can be envisioned and are understood to be included herein.

System 300 includes a master fast save restore control (FRSC) 340 that interfaces with the slave FSRC unit 360 inside each LU 310 via the DFS 320. Master/slave FSRC units 340/360 control the system and slave FSRC unit 360 clocks during low power entry/exit sequences. Master FSRC unit 340 communicates with each slave FSRC unit 360 to control the LU 310 frequency. At the start of a power down entry or exit sequence, master FSRC unit 340 enables a maximum frequency in the LU DFSs 320. Master FSRC unit 340 detects the initiation of a power down entry or exit sequence, detects the completion of a phase lock loop (PLL) relock when exiting power down, and enables each LU 310 DFS 320 with the same frequency as the system DFS 350. PLL and DFS control 330 provides control to the PLL, clock and DFSs 320. The master FSRC unit 340 communicates for incoming and outgoing communication outside system 300 via a configuration bus 370.

Each slave FSRC unit 360 tracks the LU 310 context save or restore, enters a low frequency state after save or restore completion for non-active LUs and enters an operational frequency state after save or restore completion for active LUs In a specific configuration, system 300 and its LUs 310 reside in independent power domains, thus enabling independent LU 310 power states. A controller in the system 300 power domain is required to manage the LU 310 power states. The controller is the clock and reset control each for the slave FSRC unit 360 and master FSRC unit 340. Master clock and reset controller in the system 300 interacts with each distributed LU 310 clock and reset controller. Together the controllers handle initialization, low power entry/exit, P-State change requests, for example. Slave/master FSRC unit 360/340 includes the clock and reset controller each LU 310 and system 300 to improve low power entry/exit latency efficiency.

When an LU 310 enters a power gated state, the controller enters a low frequency state to reduce power consumption. When an LU 310 exits a power gated state, the controller exits the low frequency state. When all LUs 310 enter a power gated state, the system 300 can be powered down. As part of the power down entry and exit process, the controller state is saved and restored. Since the controller is in a low frequency state when an LU 310 is power gated, the save and restore occurs at a low frequency, thus impacting latency. The present system provides a method and system to reduce the power down entry and exit latency without compromising overall power efficiency.

Power down entry and exit latency is reduced by operating the LUs 310 and the system at a maximum frequency during state save and restore. The power down entry and exit latency improvement increases with LU 310 counts if the LU 310 saves and restores occur serially. LU 310 saves and restores that occur in parallel provide identical latency improvements until system bandwidth is saturated.

As illustrated, the present system and methods balance system performance and low power. System 300 complex adjusts frequencies only for the duration of the power down entry/exit sequence. Each slave FSRC unit 360 enters a low frequency state after save or restore completion for non-active LUs. Each slave FSRC unit 360 enters an operational frequency state after save or restore completion for active LUs.

Figure 4:
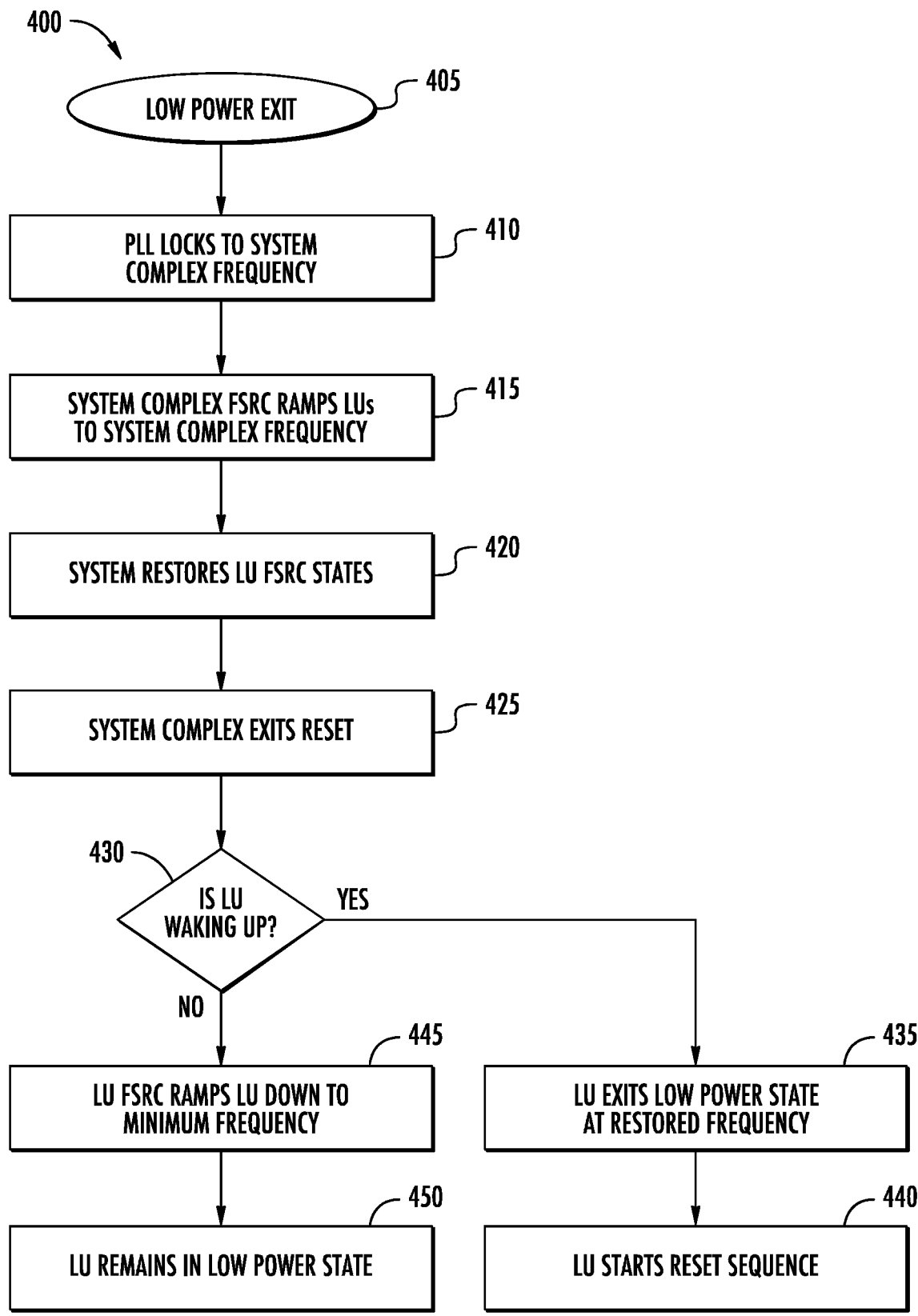
FIG. 4 illustrates a method of low power exit in the system of FIG. 3.

FIG. 4 illustrates a method 400 of a low power exit in system 300 of FIG. 3. Method 400 includes entering the low power exit at step 405. The entering of the low per exit at step 405 can occur via an interrupt, for example.

At step 410, method 400 includes PLL locking to a system frequency. Post exit, PLL is locked to a nominal operational frequency for the system.

At step 415, method 400 includes ramping the LUs slave FSRC unit to the system frequency. At step 415, master FSRC unit aligns slave LU FSRC unit frequency to the system frequency. In older systems, the slave FSRC unit in the LU remains in a low power state with a frequency slower than the master FSRC unit in the system. The slower frequency of the slave FSRC unit can cause restore latency in older systems.

At step 420, method 400 includes restoring the LU slave FSRC states. Restoring the LU slave FSRC context occurs at an aligned master and slave FSRC unit frequency. In older systems, restoring of the LU slave FSRC context occurs at misaligned master and slave FSRC unit frequencies. The slower frequency of the slave FSRC unit can cause restore latency in older systems.

At step 425, method 400 includes exiting the system reset.

At step 430, method 400 includes deciding if an LU is waking up. Waking up can include transitioning to full functional operation, for example. Step 430 can occur individually across LUs from 0 LUs to all LUs, for example.

Such a decision at step 430 can be based on the interrupt that forced the entry into the lower power exit, for example.

If it is determined at step 430 that an LU (from 0 LUs to all LUs) is waking up, method 400 includes exiting the low power state for the LU (the LU that is waking up (from 0 LUs to all LUs)) using the restored frequency from step 415 at step 435, and initiating the reset sequence of the LU at step 440. Post restore, the LU slave FSRC unit transitions to an operational or low power frequency, depending on its wake status.

If it is determined at step 430 that an LU is not waking up, method 400 includes ramping the slave FSRC unit down to the minimum frequency at step 445, and leaving the LU in the low power state at step 450. Post restore, the LU slave FSRC unit transitions to an operational or low power frequency, depending on its wake status.

Figure 5:
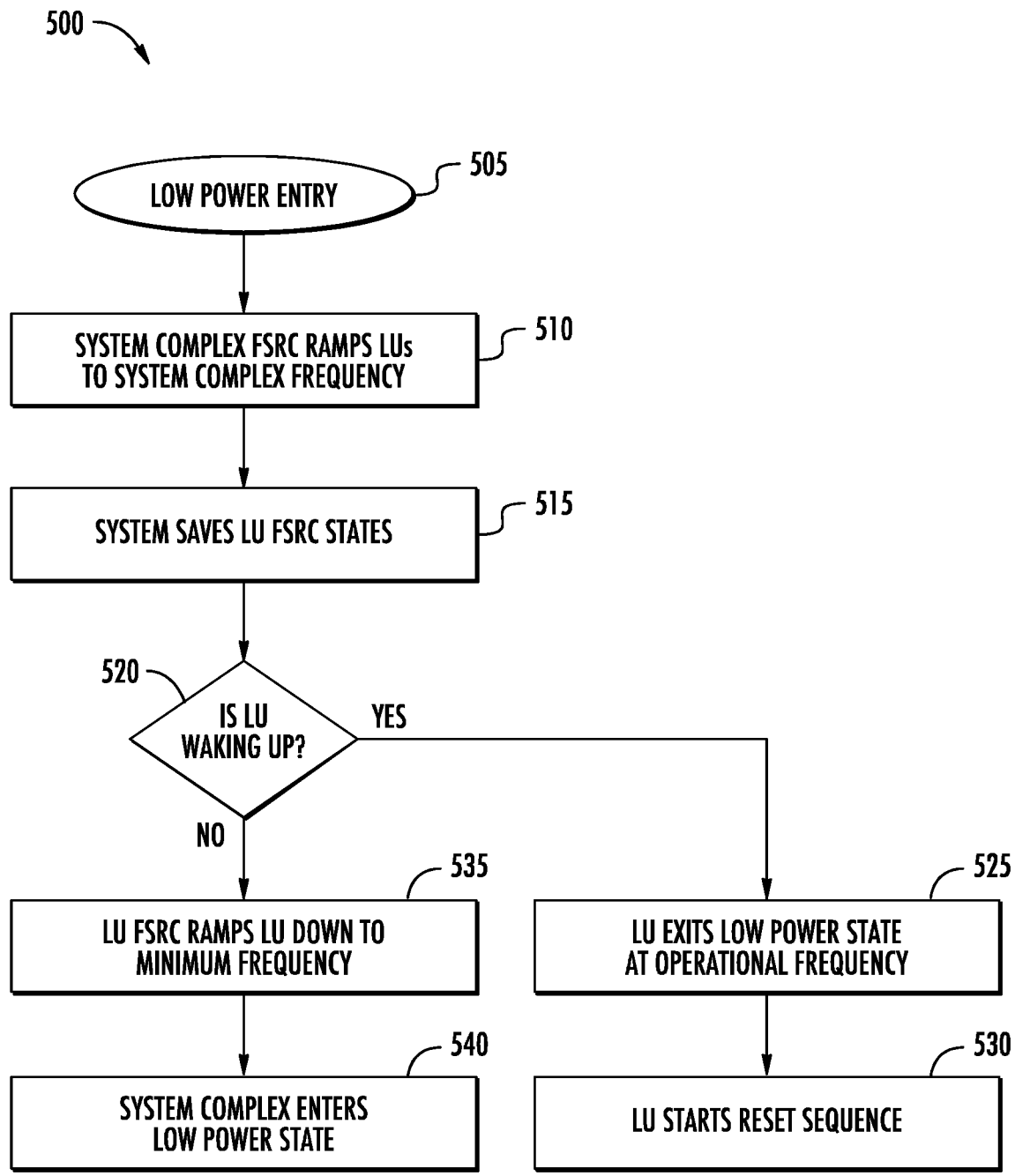
FIG. 5 illustrates a method of low power entry in the system of FIG. 3.

FIG. 5 illustrates a method 500 of low power entry in system 300 of FIG. 3. Method 500 includes entering the low power entry at step 505. Low power entry can occur by an event such as by watching a bit timer, for example.

At step 510, method 500 includes ramping the LUs slave FSRC unit to the system frequency. During the low power entry, system master FSRC unit ramps the LU slave FSRC units to the system frequency. In older systems, during context save, the slave FSRC unit in the LU is in a low power state, so its frequency is slower than the master FSRC unit in the system. In such systems, the save latency is limited by the slower LU slave FSRC unit frequency.

At step 515, method 500 includes saving the LU slave FSRC states. Saving of LU slave FSRC context occurs at aligned master and slave FSRC unit frequency. In older systems, save of LU slave FSRC context occurs at misaligned master and slave FSRC unit frequencies. In such systems, the save latency is limited by the slower LU slave FSRC unit frequency.

At step 520, method 500 includes deciding if an LU is waking up. An LU waking up can include transitioning to full functional operation, for example. Step 520 can occur individually across LUs from 0 LUs to all LUs, for example. Such a decision at step 520 can be based on the event that forced the lower power entry, for example. While illustrated as occurring after the save completion of step 515, the deciding if an LU is waking up at step 520 can occur even before the save completion in step 515.

If it is determined at step 520 that an LU is waking up, method 500 includes exiting the low power state (abort) for the LU using the operational frequency at step 525, and initiating the reset sequence of the LU at step 530. Once context save is complete, the LU slave FSRC unit transitions to an operational or low power frequency, depending on its wake status.

If it is determined at step 520 that an LU (from 0 LUs to all LUs) is not waking up, method 500 includes ramping the slave FSRC unit down to the minimum frequency at step 535, and entering the low power state at step 540. Once the context save is complete, the LU slave FSRC unit transitions to an operational or low power frequency, depending on its wake status.

By reducing power down entry/exit latency using system 300 and method 400 and method 500, deeper power states and longer residencies are enabled, battery life is improved and lower exit latencies result in better user experiences.

Figure 6:
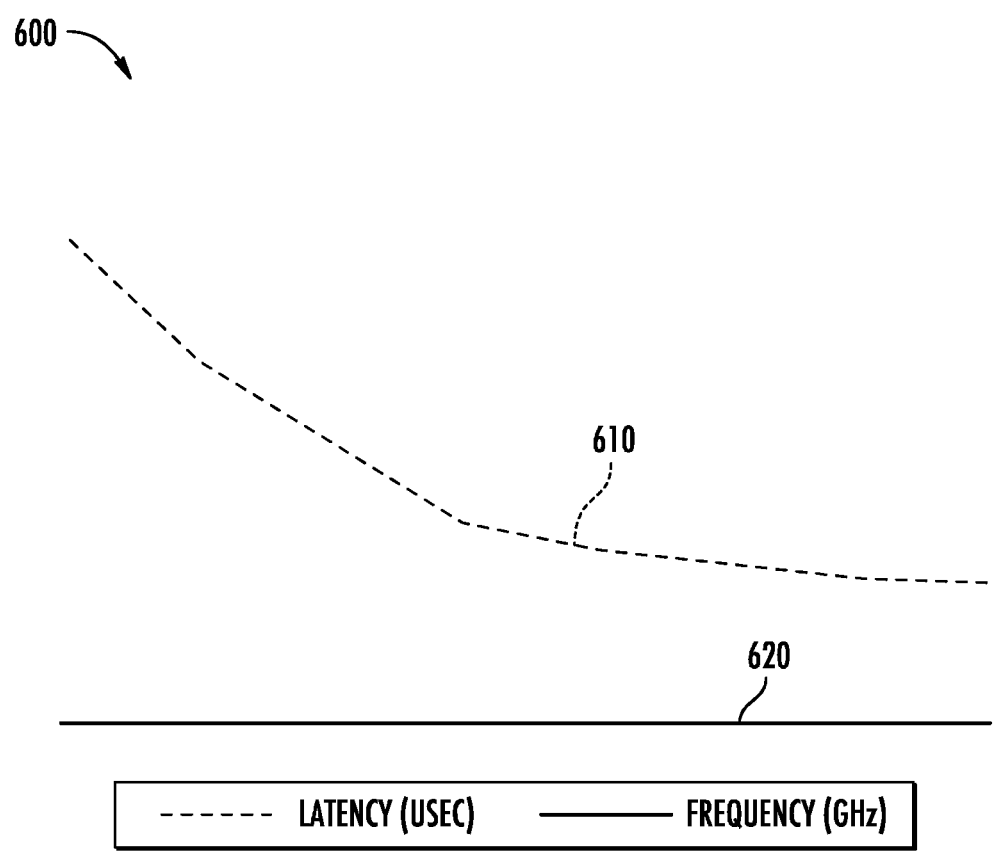
FIG. 6 illustrates a plot of the overall latency and frequency of the system and method for providing fast save restore.

FIG. 6 illustrates a plot 600 of the overall latency and frequency of the system and method for providing fast save restore. Specifically, plot 600 includes a representation of the frequency curve 620 (represented in GHz) and the latency curve 610 (represented in μs) for the described fast save/restore. As illustrated, as the frequency curve 620 increases linearly, representing linearly increasing frequency, the latency curve 610, representing latency, exponentially decreases.

The overall latency of the present system and method depends on various factors. Producers are generally more throughput limited since reading/writing to a register requires more cycles to get the context. The present implementation supports serialized register accesses. Even if a network supports burst transactions, internally at the logical units each transaction is serialized. A logical unit's burst throughput scales almost linearly with frequency. Producer-consumer network bandwidth is accounted for, i.e., if consumer has very high bandwidth, then producer won't be able to saturate sooner. Higher voltage ramp-up time can be accounted for using higher operating frequencies. Additional overhead involved with save/restore sequences is also included. As would be understood a consumer inputs the data packets and producer outputs the data packets. The consumer/producer identification is not a fixed role since consumer/producer can change their role based on state. For example, in low power entry, the producer is the LU and the system and the consumer is the SOC network, and while in low power exit producer is SOC network and the consumer is LUs and system. System complex and LUs can also be deemed as producer/consumer to each other in exit/entry case respectively.

Overall, at lower frequencies latencies are expected to be higher since a producer cannot saturate consumer bandwidth (as they are designed to handle higher frequency during normal operation). Latency reduces as frequency increases but the system saturates at higher frequencies where a consumer can saturate producer bandwidth.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, LUs 310, FSRC unit 340, 360 can be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for a low power exit comprising:
locking a system complex frequency utilizing a system digital frequency synthesizer (DFS);
ramping a plurality of logic units (LUs) to the system complex frequency by utilizing the system DFS in communication with at least one DFS associated with one of the plurality of LUs;
restoring a fast save/restore control (FSRC) state for each of the plurality of LUs utilizing at least one slave FSRC unit associated with one of the plurality of LUs;
for at least one LU of the plurality of LUs that is waking up and restored, exiting a low power state at the ramped frequency and for any LU of the plurality of LUs that is not waking up, ramping down to a minimum low frequency state; and
restarting a reset sequence for the at least one LU of the plurality of LUs that is waking up.

2. The method of claim 1, wherein the low power exit includes a producer outputting data packets to the LUs being misaligned in bandwidth with a consumer receiving the data packets.

3. The method of claim 1, wherein the low power exit includes a producer outputting data packets to the LUs being misaligned in throughput with a consumer receiving the data packets.

4. A method comprising:
ramping a plurality of logic units (LUs) to system frequency utilizing a system digital frequency synthesizer (DFS);
saving a fast save/restore control (FSRC) state for each of the plurality of LUs utilizing at least one slave FSRC unit associated with ones of the plurality of LUs;
for at least one LU of the plurality of LUs that is waking up, exiting a low power state at the system frequency and for any LU of the plurality of LUs that is not waking up, ramping down to a minimum low frequency state; and
restarting a reset sequence for the at least one LU of the plurality of LUs.

5. The method of claim 4, wherein the low power entry includes a producer outputting data packets to the LUs being misaligned in bandwidth with a consumer receiving the data packets.

6. The method of claim 4 wherein the low power entry includes a producer outputting data packets to the LUs being misaligned in throughput with a consumer receiving the data packets.

7. A system for a fast save/restore comprising:
a plurality of logical units (LUs) residing in independent power domains;
one or more digital frequency synthesizers (DFS), each of the one or more DFS associated with one of the plurality of LUs, the one or more DFSs configured to lock a system complex frequency and ramp the plurality of LUs to system complex frequency; and
one or more slave fast save/restore control (FSRC) units, each slave FSRC unit being associated with one of the plurality of LUs, and configured to save/restore FSRC states of the plurality of LUs,
wherein for at least one LU of the plurality of LUs that is waking up and restored, the at least one LU configured to exit a low power state by restarting a reset sequence, and for any LU of the plurality of LUs that is not waking up, the any LU configured to ramp down to a minimum low frequency state.

8. The system of claim 7, wherein the plurality of LUs are CPU cores, graphics cores, or other processors.

9. The system of claim 7, wherein the plurality of LUs interact with another computer unit that are shared between the plurality of LUs.

10. The system of claim 7, wherein each DFS of one or more DFS is uniquely matched with one of the plurality of LUs.

11. The system of claim 7, wherein each slave FSRC unit of one or more slave FSRC units is uniquely matched with one of the plurality of LUs.

12. The system of claim 7, wherein each slave FSRC unit of one or more slave FSRC units is uniquely matched with one of the one or more DFS.

13. The system of claim 7, further comprising a master fast save restore control (FRSC) unit configured to interface with the one or more slave FSRC unit associated with each LU via the DFS.

14. The system of claim 13, wherein the master/slave FSRC units control the system and slave FSRC unit clocks during low power entry/exit sequences.

15. The system of claim 13, wherein the master FSRC unit operates with each slave FSRC unit to control the LU frequency.

16. The system of claim 13 wherein the master FSRC unit enables a maximum frequency in the LU DFS at the start of a power sequence.

17. The system of claim 16 wherein the power sequence is one of a power down entry and a power down exit.

18. The system of claim 7 wherein each slave FSRC unit tracks an LU context during low power entry/exit sequences, enters a low frequency state after completion for non-active LUs and enters an operational frequency state after completion for active LUs.

19. The system of claim 7 wherein power down entry and exit latency is reduced by operating the LUs and the system at a maximum frequency during state save and restore.

20. The system of claim 7, wherein a low power sequence includes one of a producer outputting data packets to the LUs being misaligned in bandwidth with a consumer receiving the data packets and the producer outputting data packets to the LUs being misaligned in throughput with the consumer receiving the data packets.

* * * * *